United States Patent Office 2,720,511
Patented Oct. 11, 1955

2,720,511

COPOLYMERS AND PREPARATION OF SAME

Martin Eli Cupery and John Carl Sauer, Wilmington, Del., assignors to E. I. du Pont de Nemours & Company, Wilmington, Del., a corporation of Delaware No Drawing. Application June 3, 1954,
Serial No. 434,322

5 Claims. (Cl. 260—86.1)

This invention relates to copolymers and the preparation of same and, more particularly to substantially linear copolymers containing primary amino groups, and the preparation of such copolymers.

Polymeric materials containing amino groups are becoming increasingly important in many technical applications, especially when the amino groups are primary and, therefore, reactive and capable of curing or crosslinking to give products of improved resistance to physical or chemical agents. However, the choice of amine polymers suitable for various uses is rather limited. Few polymers which contain primary amino groups and which are of general use, for example in the coating and impregnating arts, are known, and fewer still can be obtained from available and economical materials. Moreover, most if not all primary amino polymers are prepared by indirect methods involving conversion of a variety of functional groups to amino groups, with resulting nonuniformity in the composition of the final products. Substantially linear primary amino polymers which can be prepared directly by a one-step polymerization process, have not heretofore been practically obtainable.

An object of the present invention is to provide a new class of substantially linear polymers containing primary amino groups. A further object is to provide such polymers which can be prepared from economical materials and which are particularly well adapted for use in the coating and impregnating arts. A further object is to provide a process of preparing such polymers by a direct, one-step polymerization process. Other objects will be apparent from the description of the invention given hereinafter.

The above objects are accomplished according to the present invention by providing a new class of copolymers which are substantially linear copolymers of beta-vinyloxyethylamine and alpha-methylene monocarboxylic acid esters of aliphatically saturated hydrocarbon alcohols or alkoxyhydrocarbon alcohols, the polymeric components of which essentially consist of, by weight, 1% to 30% of the beta-vinyloxyethylamine and 70% to 99% of the ester. The invention further comprises the preparation of such copolymers by polymerizing a mixture of beta-vinyloxyethylamine and an alpha-methylene monocarboxylic acid ester of an aliphatically saturated hydrocarbon or alkoxyhydrocarbon alcohol in the presence of an azonitrile polymerization initiator substantially in the absence of water.

The copolymers of this invention are substantially linear polymers which vary from highly viscous oils to resinous solids. Their molecular weight is in excess of 1,000, generally in the 2,000–10,000 range. They possess good solubility in many common organic solvents, e. g., ketones such as acetone or methyl ethyl ketone, cyclic esters such as dioxane or tetrahydrofuran, aromatic hydrocarbons such as benzene or toluene, and more limited solubility in alcohols. They are insoluble in water but many of them, depending in part on the amount of polymerized beta-vinyloxyethylamine, in part on the length and nature of the alcohol portion of the polymerized ester, in part on the presence or absence of additional polymerized components and in part on the molecular weight, are soluble in dilute aqueous acids, for example, in 1–10% aqueous acetic acid or in water containing dissolved carbon dioxide. This property is highly advantageous in many applications. Polymers which are partly or wholly insoluble in dilute acids can be made into colloidal dispersions by neutralizing the polymer in a water-miscible solvent such as acetone with an acid such as acetic acid and slowly adding water with mixing, whereby an aqueous dispersion of very fine particle size is formed.

Due to the presence of primary amino groups, these new copolymers are readily cured to give crosslinked, insoluble products. This curing can be effected simply by air-drying, or by heating. Conventional dryers such as cobalt naphthenate accelerate the curing process. Because of their ability to cure and their good film-forming properties, these copolymers are especially useful in coating compositions which can be clear or pigmented.

The copolymers of this invention can be prepared by polymerizing the two essential monomeric components together in suitable proportions, with or without additional polymerizable vinylidene monomers essentially unreactive with primary amino groups. Beta-vinyloxyethylamine polymerizes in general at a slower rate than the alpha-methylene carboxylic acid. For this reason, it is preferable to start with a monomer mixture containing between about 3% and 50%, by weight of the two essential components, of beta-vinyloxyethylamine in order to obtain a copolymer containing between about 1% and 30%, by weight, of polymerized beta-vinyloxyethylamine.

The polymerization must be carried out under conditions which do not lead to the formation of crosslinked, insoluble polymers. To this end, the monomeric components are preferably polymerized in the substantial absence of water and in the presence of an azonitrile polymerization initiator. It is convenient to carry out the polymerization reaction in an organic solvent, preferably one that has appreciable solvent action on both the monomeric components and the copolymer being formed. An excess of one monomeric component or the other can serve as the polymeric solvent reaction medium. Although substantial absence of water is a requisite condition to assure formation of a substantially linear copolymer, minor amounts of water often found in technical grade organic solvents, e. g., up to about 5% by weight of the solvent, can be tolerated. The polymerization reaction is conveniently carried out in open vessels under reflux but, particularly at higher temperatures, it can be carried out in closed vessels under the autogenous pressure of the reactants, and additional pressure can be applied if necessary.

Another method of preparing the copolymers of this invention is that described in U. S. application Serial No. 323,937, filed on December 3, 1952, now Patent Number 2,686,173, by J. C. Sauer, one of the present applicants, as a continuation-in-part of U. S. application Serial No. 269,339, filed January 31, 1952, and now abandoned. This method consists in forming a copolymer of an aliphatic-methylene monocarboxylic acid with a low alkanoic acid amide of beta-vinyloxyethylamine, e. g., N-beta-vinyloxyethyl) formamide, and hydrolyzing the copolymer, for example, by heating it with aqueous hydrochloric acid or with methanol containing sodium methoxide. In this manner, the amido groups are converted to a greater or lesser extent to primary amino groups and there is obtained a copolymer containing combined beta-vinyloxyethylamine groups.

The following examples in which all proportions are by weight unless otherwise stated, illustrate the preparation of specific copolymers according to the present invention.

EXAMPLE I

*Methyl methacrylate/beta-vinyloxyethylamine copolymer*

A solution comprising 85 parts methyl methacrylate, 15 parts beta-vinyloxyethylamine, 200 parts dioxane, and 0.5 part alpha,alpha'-azodiisobutyronitrile was heated under nitrogen atmosphere in a pressure vessel at 65° C. for 17 hours. The solution then had a viscosity of 8.9 poises at 25° C. and contained 32.4% non-volatile solids, corresponding to 97% conversion of monomers to polymer. The product was purified by precipitation with water and washing with water under conditions of thorough mixing. After dissolving in dioxane, the precipitation and washings with water were repeated. Another precipitation and washing cycle gave a product which gave no indication of alkalinity in the wash water after contact with water for one hour. This product was highly soluble in acetone and dioxane and moderately soluble in ethanol and benzene. It was slowly dissolved in 3% acetic acid. The addition of water to an acetone solution of the product gave immediate precipitation, but water added to an acetone solution which had been acidified with acetic acid gave no precipitation. Titration with 0.1 normal hydrochloric acid carried out in 80% ethanol with bromophenol blue indicator gave a neutral equivalent value of 2940, corresponding to 3% by weight of polymerized beta-vinyloxyethylamine. The solution of purified copolymer in dioxane at 23.4% solids had a viscosity of 2.0 poises at 25° C. Analysis of the polymer for nitrogen content showed 0.71% total nitrogen in the copolymer. This value would correspond to 4.4% of polymerized beta-vinyloxyethylamine and it suggests that some of the nitrogen was present as amido groups.

Coatings of the above copolymer applied to freshly sanded steel cured to insoluble films on air-drying. These coatings had better flexibility, greater adhesion, and considerably better durability on outdoor exposure than corresponding coatings of unmodified methyl methacrylate polymer made by a similar polymerization process.

EXAMPLE II

*Methyl methacrylate/beta-vinyloxyethylamine copolymer*

A solution comprising 70 parts of methyl methacrylate, 30 parts of beta-vinyloxyethylamine, 200 parts of dioxane, and 0.5 part alpha,alpha'-azodiisobutyronitrile, was heated at 65° C. for 17 hours. The solution then had a viscosity of 2.1 poises at 25° C. and contained 29.2% solids, corresponding to 88% conversion of monomers to polymer. The product was purified by repeated precipitations from dioxane solution by addition of water as described in Example I. The purified copolymer was soluble in acetone, dioxane and ethanol and dissolved readily in 3% acetic acid. Titration with 0.1 normal hydrochloric acid in 80% ethanol using bromophenol blue indicator, gave a neutral equivalent value of 1428, corresponding to 6.1% by weight of polymerized beta-vinyloxyethylamine. A dioxane solution of the purified copolymer at 25.45% solids and 25° C. had a viscosity of 2.4 poises. Analysis for nitrogen content showed 1.38% total nitrogen in the copolymer. This value corresponds to 8.57% of polymerized beta-vinyloxyethylamine, and it indicates the presence of amido groups in the polymer.

Coatings obtained from aqueous or dioxane solutions of the above copolymer neutralized with acetic acid had excellent flexibility, toughness and adhesion, being much superior in these properties to unmodified methyl methacrylate. Moreover, in the presence of added cobalt driers (acetate or naphthenate at 0.04% concentration based on copolymer) such coatings cured to insoluble films on air-drying at room temperature for 20 hours. Without added drier the films required several days to insolubilize and unmodified methyl methacrylate, prepared by a similar polymerization, showed no insolubilization with or without drier after several weeks.

EXAMPLE III

*Methyl methacrylate/beta-vinyloxyethylamine copolymer*

A solution of 80 parts methyl methacrylate, 20 parts of beta-vinyloxyethylamine and 0.2 part of alpha,alpha'-azobis (alpha,gamma-dimethylvaleronitrile) initiator was heated at 50°–60° C. for 2 hours under an atmosphere of nitrogen. The unreacted monomers were removed by evaporation under reduced pressure (20 mm.) for 24 hours. Analysis of the residual copolymer indicated 1.42% nitrogen (Kjeldahl method), corresponding to 8.8% vinyloxyethylamine content. The copolymer could be compressed at 160° C. to a clear film which did not dissolve in 10% acetic acid, although it became highly swollen. The polymer in the form of films at 10 mil thickness was comparable in impact strength to an unmodified methyl methacrylate control made by a similar polymerization, but it was more flexible. Due to the vinyloxyethylamine content, this copolymer can be insolubilized with or without drier.

EXAMPLE IV

*Methoxyethyl methacrylate/beta-vinyloxyethylamine copolymer*

A solution comprising 85 parts methoxyethyl methacrylate, 15 parts beta-vinyloxyethylamine, 186 parts dioxane, and 2.5 parts alpha,alpha'-azodiisobutyronitrile was heated under a nitrogen atmosphere at 65° C. for 4 hours. The solution then had a viscosity of 1.1 poises and the conversion of monomers to copolymer was about 80% of theory. The product was purified by precipitation with petroleum ether and washing twice with the same solvent. It was then dissolved in dioxane and the precipitation-washing cycle repeated. Another precipitation and washing cycle gave a pure copolymer which was dissolved in dioxane solution. The residual petroleum ether was removed under reduced pressure. The final dioxane solution at 40% solids and 25° C. had a viscosity of 5.9 poises. The product had good solubility in most organic solvents and dissolved readily in 3% acetic acid. Titration in 80% ethanol with 0.1 normal hydrochloric acid using bromophenol blue indicator gave a neutral equivalent value of 2730, corresponding to 3.2% by weight of polymerized beta-vinyloxyethylamine. A 17.4% aqueous solution of the acetate at pH 5.6 had a viscosity of 0.4 poise. Solutions of the copolymer in dioxane or aqueous solutions of the copolymer acetate, in the presence of added cobalt drier (cobalt acetate or naphthenate) cured rapidly on air-drying to insoluble, colorless, clear, glossy films having excellent hardness, toughness, flexibility and adhesion.

EXAMPLE V

*Methyl acrylate/beta-vinyloxyethylamine copolymer*

A solution comprising 72 parts methyl acrylate, 8 parts beta-vinyloxyethylamine, 170 parts dioxane and 2 parts alpha,alpha'-azodiisobutyronitrile was heated in a closed vessel under nitrogen at 65° C. for 4 hours. The solution then had a viscosity of 0.75 poise and contained 27.3% solids, corresponding to 91% conversion of monomers to polymer. After purification by the procedure of Example IV, a dioxane solution of the pure copolymer at 41.2% solids and 25° C. had a viscosity of 5.9 poises. Titration by the already described procedure indicated a neutral equivalent value of 1860, corresponding to 4.7% by weight of polymerized beta-vinyloxyethylamine. The copolymer was readily dissolved in dilute aqueous acetic acid. Films of the copolymer, or of the copolymer acetate, cured to insoluble films on air-drying. In the presence of cobalt driers the rate of curing was greatly accelerated. On overnight air-drying, such films had very slight residual tackiness which disappeared on further drying, yielding flexible, tough films.

A copolymer prepared by the identical procedure as above, with the exception that one part of beta-mercaptoethanol was added, gave a product of lower viscosity, i. e., a dioxane solution of the purified copolymer (neutral equivalent 1800) at 43.7% solids and 25° C. had a viscosity of 1.4 poises.

EXAMPLE VI

*Methyl acrylate/beta-vinyloxyethylamine copolymer*

A solution of 40 parts methyl acrylate, 170 parts benzene, 40 parts beta-vinyloxyethylamine and 2 parts alpha,-alpha'-azodiisobutyronitrile was heated at 70° C. for 4 hours, in a closed container under nitrogen atmosphere. About 49% of the monomer weight was converted to polymer. The copolymer, after precipitation with petroleum ether and washing with the same non-solvent, was dissolved in dioxane. Further purification was accomplished by two successive precipitations and washings with petroleum ether. The copolymer was then dissolved in dioxane and the residual petroleum ether removed under reduced pressure. The resulting solution at 23.7% solids had a viscosity of 0.35 poise at 25° C. The copolymer had a neutral equivalent value of 328, indicating a 26.5% content of polymerized beta-vinyloxyethylamine. The copolymer was highly soluble in aqueous solutions of acids such as acetic and carbonic acids.

Films of this copolymer after air-drying were clear, colorless, highly flexible and had a rubber-like character. Films containing 0.02% cobalt became insoluble in organic solvents, such as dioxane, on air-drying for 24 hours.

EXAMPLE VII

*Methoxyethyl acrylate/beta-vinyloxyethylamine copolymer*

A solution comprising 45 parts methoxyethyl acrylate, 15 parts beta-vinyloxyethylamine, 185 parts dioxane and 1.5 parts alpha,alpha'-azodiisobutyronitrile in a closed vessel under nitrogen was heated at 65° C. for 4 hours. The solution then had a viscosity of 0.22 poise at 25° C. and contained 20.6% solids, corresponding to 84% conversion of monomers to polymer. After purification by the procedure described in Example IV the copolymer in dioxane at 26.1% solids had a viscosity of 0.4 poise at 25° C. The neutral equivalent was 722, corresponding to 12% by weight of polymerized beta-vinyloxyethylamine. An aqueous solution of the acetate at 25.4% solids and pH 6.0 had a viscosity of 0.65 poise at 25° C. Films of the copolymer cured slowly, on air-drying at ordinary or at elevated temperature, to insoluble, highly flexible films which had excellent film properties.

EXAMPLE VIII

*Butyl methacrylate/beta-vinyloxyethylamine copolymer*

A solution comprising 48 parts butyl methacrylate, 12 parts beta-vinyloxyethylamine, 140 parts dioxane and 1.2 parts alpha,alpha'-azodiisobutyronitrile was heated under nitrogen at 65° C. for 4 hours. The solution then had a viscosity of 0.14 poise at 25° C. and contained 21.5% solids, corresponding to about 72% conversion of monomers to polymer. The major portion of the residual vinyloxyethylamine was removed by warming under reduced pressure (about 10 mm. mercury). The copolymer was precipitated by the addition of about an equal volume of 75% methanol, and then washed twice with essentially anhydrous methanol. The copolymer was dissolved in dioxane and again precipitated and washed with methanol as above. The purified copolymer was dissolved in dioxane and the residual methanol removed by evaporation under reduced pressure. The residual solution at 25.7% solids and 25° C. had a viscosity of 0.75 poise. A titration by the procedure of Example I indicated a neutral equivalent value of 3960, corresponding to 2.2% by weight of polymerized beta-vinyloxyethylamine.

A similar copolymer prepared by an identical procedure except using a 36/24 monomer ratio of butyl methacrylate/vinyloxyethylamine gave 57% conversion of monomers to copolymer which had a neutral equivalent value of 2070, corresponding to 4.2% by weight of polymerized beta-vinyloxyethylamine. After purification the latter product at 24.8% solids and 25° C. in dioxane had a viscosity of 0.50 poise.

Both products described above formed clear, colorless films which had excellent hardness, toughness, and flexibility. In the presence of a cobalt drier these products cured rapidly, on air-drying, to insoluble films. In contrast, a butyl methacrylate homopolymer prepared in dioxane by the same polymerization procedure did not cure to insoluble films on air-drying, with or without added cobalt drier.

EXAMPLE IX

*Lauryl methacrylate/beta-vinyloxyethylamine copolymer*

A mixture of 180 parts of lauryl methacrylate, 14.5 parts of N-(beta-vinyloxyethyl)formamide (B. P. 80° C. at 0.9 mm. pressure; prepared by reacting methyl formate with beta-vinyloxyethylamine at the temperature of the exothermic reaction) and 1 part of alpha,alpha'-azodiisobutyronitrile was heated for 4 hours at 65° C. in an atmosphere of nitrogen. There was thus obtained a lauryl methacrylate/N-(beta-vinyloxyethyl)formamide copolymer as an oil-soluble, clear, tacky, rubber-like resin.

To a solution of 90 parts of this copolymer in about 400 parts of benzene was added 110 parts of 18% aqueous hydrochloric acid and the resulting mixture was heated at a gentle reflux for one hour with stirring. The resulting creamy emulsion was treated with an excess of 20% aqueous sodium hydroxide solution and the organic layer was separated, washed well with water, and any retained benzene and water was removed by evaporation at steam bath temperature, first under atmospheric pressure and finally under reduced pressure. There was thus obtained an oil-soluble, highly viscous, tacky copolymer readily insolubilized with or without drier and which upon analysis was found to contain 0.25% by weight of primary amino nitrogen, indicating the presence of 1.5% by weight of polymerized beta-vinyloxyethylamine.

It will be understood the above examples are merely illustrative and that the invention broadly comprises the substantially linear copolymers of beta-vinyloxyethylamine and an alpha-methylene monocarboxylic acid ester of an aliphatically saturated hydrocarbon or alkoxy hydrocarbon alcohol, the polymeric components of which essentially consist of, by weight, 1% to 30% of beta-vinyloxyethylamine and 70% to 99% of the ester, and the process of preparing these copolymers by polymerizing a mixture of the monomeric components in the presence of an azonitrile polymerization initiator substantially in the absence of water.

The beta-vinyloxyethylamine and the alpha-methylene monocarboxylic acid ester are essential components of the instant copolymers. The esters are those of alcohols of the formula ROH where R is a monovalent aliphatically saturated hydrocarbon radical having at most one substituent, that being an alkoxy group. The alcohol may be alternately defined as an aliphatically saturated alcohol containing only carbon, hydrogen, and singly bonded, acyclic oxygen.

Additional specific examples of suitable alpha-methylene monocarboxylic acid esters for use in the present copolymers, include ethyl acrylate, n-hexyl acrylate, n-octyl methacrylate, myristyl acrylate, cetyl methacrylate, stearyl methacrylate, isopropyl acrylate, sec.-butyl acrylate, 3-methyl-2-pentyl methacrylate, tert.-butyl acrylate, tert.-amyl methacrylate, cyclohexyl methacrylate, decahydronaphthyl acrylate, benzyl methacrylate, beta-phenylethyl acrylate, methoxymethoxyethyl acrylate, ethoxyethyl methacrylate, n-butoxymethyl methacrylate, 2-methoxy-1-cyclohexyl acrylate, o-methoxybenzyl methacrylate, methyl alpha-chloroacrylate, ethyl alpha-bromoacrylate, methyl alpha-ethyl acrylate, methyl alpha-n-butyl acrylate, and the like.

The preferred polymerizable esters are those having the formula

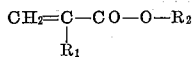

where $R_1$ is hydrogen or alkyl of 1 to 2 carbon atoms, inclusive, and $R_2$ is an aliphatically saturated hydrocarbon or alkoxy-substituted hydrocarbon radical having a total of 1 to 18 carbon atoms, inclusive. Still more preferred are the esters of acrylic or methacrylic acid with primary alkanols, or alkoxy-substituted alkanols having a total of 1 to 12 carbon atoms, inclusive, any alkoxy group present having 1 to 2 carbon atoms, inclusive, i. e., the compounds of the above formula where $R_1$ is hydrogen or methyl and $R_2$ is a primary alkyl, methoxyalkyl, or ethoxyalkyl radical, $R_2$ having a total of 1 to 12 carbon atoms, inclusive. The most accessible and therefore preferred polymerizable esters, particularly for use in coating compositions, are the acrylic and methacrylic acid esters of unsubstituted or methoxy substituted primary alkanols of 1 to 4 carbon atoms, inclusive, i. e., the compounds of the above formula where $R_1$ is hydrogen or methyl and $R_2$ is a primary alkyl or methoxyalkyl radical having a total of 1 to 5 carbon atoms, inclusive.

It will be evident that instead of using a single alpha-methylene monocarboxylic acid ester as above, a plurality of such esters may be used in equivalent proportion without departing from the instant invention. The copolymers of this invention also do not exclude polymerizable components other than the two essential ones discussed above. Such third components may be present up to as high as 20% of the total weight of the copolymer although usually not in excess of 10%, without materially altering the essential characteristics of these copolymers. However, such third components must be of a character that they will not lead to the initial formation of a cross-linked copolymer. Polymerizable compounds essentially unreactive with primary amino groups and having a terminal methylene group, i. e., a terminal $CH_2$ group doubly bonded to the adjacent carbon atom, as the sole polymer-forming functional group, can be used as third components without materially affecting the fundamental characteristics of these copolymers. Examples of such third components are the vinylidene halides such as vinyl chloride and the vinylidene hydrocarbons such as styrene. Whether third components are present or not in these copolymers, the beta-vinyloxyethylamine should amount to at least 1% and, preferably, should not exceed 30%, by weight of the copolymer according to this invention.

These copolymers are preferably prepared by polymerizing a mixture of the monomeric components in suitable proportions in an organic solvent reaction medium, the organic solvent preferably having appreciable solvent action on both the monomers and the copolymer to be formed. Such organic solvents include aromatic hydrocarbons such as benzene, toluene or the xylenes; ketones such as acetone, methyl isobutyl ketone, cyclohexanone; alcohols such as ethanol, isopropyl alcohol, tertiary butyl alcohol; acyclic or cyclic ethers such as isopropyl ether, di-n-butyl ether, dioxane, tetrahydrofuran; and the like. The amount of solvent, when one is used, may vary between about 10% and about 1000% of the total weight of monomers.

The polymerization initiators suitable for the preparation of these copolymers are certain organic solvent-soluble initiators of the free radical-generating type, specifically the azo compounds described in U. S. Patent 2,471,959, e. g., the azonitriles such as alpha,alpha'-azodiisobutyronitrile; alpha,alpha' - azobis(alpha,gamma - dimethylvaleronitrile); dimethyl - alpha,alpha' - azodiisobutyrate; 1,1' - azodicyclohexanecarbonitrile; and the like. The initiator need be used only in minor amounts, e. g., between 0.1% and 5%, preferably between 0.5% and 1.5%, of the weight of the total polymerizable materials. The peroxide initiators such as benzoyl peroxide are generally not satisfactory because of their tendency to oxidize vinyloxyethylamine. Likewise, other oxidizing initiator systems such as potassium persulfate with or without reducing agents are generally unsatisfactory.

The polymerization temperature is not critical. Since the rate of polymerization is usually very slow at temperatures below about 25° C., it is preferred to operate at higher temperatures, and preferably within the range from 40° C. to 100° C. However, higher temperatures, e. g., up to 150° C., can be used.

The copolymers of this invention can be mixed or blended with conventional ingredients of resinous compositions such as dyes, pigments, fillers, plasticizers, extenders, reinforcing agents, and the like. As shown in the examples, conventional driers can be used to advantage to accelerate the curing of the copolymers.

Because of their film-forming ability and air-drying properties, the copolymers of this invention are especially useful as ingredients of coating compositions, which can be clear or pigmented. Clear compositions can be prepared with any suitable organic solvent such as acetone, methyl isobutyl ketone, n-butyl alcohol, and the like. Copolymers which are soluble in dilute aqueous acids such as acetic or carbonic acid, can be formulated into aqueous or aqueous-organic coating compositions. A wide variety of pigments can be incorporated in either the aqueous or organic compositions, including titanium dioxide, carbon black, iron blues, phthalocyanine blues and greens, metal oxides and chromates, organic maroons, and various inert extenders such as talc, barytes and china clay.

The curing or thermosetting of films or molded objects shaped from the copolymers of this invention can be carried out simply by air-drying, or by heating at temperatures varying from about 50° C. to about 250° C. for periods varying, depending upon the temperature, from a few minutes to several hours. Conventional driers such as cobalt naphthenate accelerate the drying process. Crosslinking, leading to products which are insoluble in organic solvents or dilute aqueous acids, can also be effected by reaction with aldehydes such as formaldehyde or glyoxal, or with polyfunctional esters (esters of dibasic or polybasic acids), or with diisocyanates or other polyfunctional reagents such as dibasic acid chlorides or polymethylolamides. Polymers containing epoxide groups, such as the resins obtained by reacting a dihydric phenol with epichlorohydrin ("Epon" resins) are outstanding crosslinking agents. For example, a methyl acrylate/beta-vinyloxyethylamine copolymer containing 6.1% by weight of polymerized beta-vinyloxyethylamine was compatible at a 5/1 ratio by weight with a dihydric phenol/epichlorohydrin resin having a melting point of 40–45° C. and an epoxy equivalent per 100 g. of 0.29 ("Epon" 1064). Upon heating a film of this composition at 80° C. for 1.5 hours it became insoluble in dioxane and other common organic solvents. The cured film was tough, glossy, highly resistant to water and had much better hardness than films of either component used separately.

In addition to their use in coating and impregnating compositions for fibrous or nonfibrous surfaces such as metal surfaces, paper, wood or textiles, the copolymers of this invention have many other uses, as in molding compositions, as thermosetting resins, polycationic polyelectrolytes, treating agents for textiles, leather and paper, adhesives, dispersing agents for waxes and oils, binders for printing inks and paints, and gelatin substitutes.

The copolymers of this invention are those essentially consisting of, by weight, 1% to 30% of the beta-vinyloxyethylamine and 70% to 99% of the alpha-methylene monocarboxylic acid ester. Below 1% of beta-vinyloxyethylamine, properties of the copolymer attributable to the beta-vinyloxyethylamine are rapidly lost and no appreciable advantage of the invention is taken. On the other hand, substantially more than 30% of beta-vinyloxyethylamine is not warranted because any additional beneficial effect resulting from using more than 30% is so slight that it is more than offset by the added cost of the beta-vinyloxyethylamine, this being the more expensive component.

The proportions of the components of the copolymer as given herein are based on neutralization equivalent determinations. The nitrogen in these copolymers is nearly all present as basic, i. e., amino nitrogen. In some instances, it has been found that a portion of the total nitrogen is not accounted for by neutralization equivalent determinations. This suggests that amidation took place to a certain extent during the polymerization but it has no appreciable effect on the properties of the copolymer. Such nitrogen does not enter into the calculations of the proportions based on neutralization equivalent determinations.

The basic nitrogen of these copolymers is believed to be present substantially entirely as primary amino nitrogen. Nevertheless, Van Slyke nitrogen determinations have shown some variation from neutralization equivalent determinations. Any such discrepancy may be due to inherent difficulties in carrying out both determinations and by the possible disappearance of some of the primary amino groups through partial crosslinking on standing, even in solution. In any event, for purposes of this invention, the proportions of beta-vinyloxyethylamine and alpha-methylene monocarboxylic acid ester can be based on neutralization equivalent determinations.

As many apparently widely different embodiments of this invention may be made without departing from the spirit and scope thereof, it is to be understood that the invention is not limited to the specific embodiments thereof except as defined in the appended claims.

The invention claimed is:

1. A substantially linear copolymer of beta-vinyloxyethylamine and an alpha-methylene monocarboxylic acid ester of an aliphatically saturated hydrocarbon alcohol having at most one substituent, that being an alkoxy group, the polymeric components of which essentially consist of, by weight, 1% to 30% of said beta-vinyloxyethylamine and 70% to 99% of said ester.

2. A substantially linear copolymer as set forth in claim 1 wherein said ester is an acrylic ester of an alcohol from the group consisting of alkanols having from 1 to 12 carbon atoms, inclusive, and alkoxy-substituted alkanols having a total of 1 to 12 carbon atoms, inclusive, wherein said alkoxy group has 1 to 2 carbon atoms, inclusive.

3. A substantially linear copolymer as set forth in claim 1 wherein said ester is a methacrylic ester of an alcohol from the group consisting of alkanols having from 1 to 12 carbon atoms, inclusive, and alkoxy-substituted alkanols having a total of 1 to 12 carbon atoms, inclusive, wherein said alkoxy group has 1 to 2 carbon atoms, inclusive.

4. A substantially linear copolymer of beta-vinyloxyethylamine and methyl methacrylate, the polymeric components of which essentially consist of, by weight, 1% to 30% of said beta-vinyloxyethylamine and 70% to 99% of said methyl methacrylate.

5. The process of preparing a substantially linear copolymer which comprises polymerizing, in the presence of about 0.1% to 5% of the weight of polymerizable material of an azonitrile polymerization initiator and substantially in the absence of water, a mixture of an alpha-methylene monocarboxylic acid ester of an aliphatically saturated hydrocarbon alcohol having at most one substituent, that being an alkoxy group, and about 3% to 50% of beta-vinyloxyethylamine based on the weight of said ester and beta-vinyloxyethylamine present.

No references cited.